(12) United States Patent
Hughes et al.

(10) Patent No.: US 6,282,268 B1
(45) Date of Patent: *Aug. 28, 2001

(54) VOICE PROCESSING SYSTEM

(75) Inventors: Jeremy Peter James Hughes, Southampton; Brian Hulse, Romsey; Robert Michael Jordan, Winchester; Caroline Edith Maynard, Winchester; John Brian Pickering, Winchester; Andrew Ritchie, Eastleigh, all of (GB)

(73) Assignee: International Business Machines Corp., Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/976,201

(22) Filed: Nov. 21, 1997

(30) Foreign Application Priority Data

May 6, 1997 (GB) .................................................. 9709187

(51) Int. Cl.[7] .............................. H04M 1/64; H04M 3/42; G10L 17/00
(52) U.S. Cl. ...................................... 379/88.03; 379/88.02; 379/88.07; 379/88.17; 379/201; 704/243; 704/246; 704/260
(58) Field of Search .......................... 379/67.1, 68, 88.01, 379/88.03, 88.08, 88.16, 88.02, 88.07, 88.17, 88.26, 201, 219, 242; 704/243, 254, 256, 260, 246

(56) References Cited

U.S. PATENT DOCUMENTS

| 5,133,004 | * | 7/1992 | Heileman, Jr. et al. | 379/88.26 |
| 5,155,760 |   | 10/1992 | Johnson et al. | 379/67 |
| 5,297,183 | * | 3/1994 | Bareis et al. | 379/59 |
| 5,325,421 | * | 6/1994 | Hou et al. | 379/67 |
| 5,459,781 |   | 10/1995 | Kaplan et al. | 379/351 |
| 5,475,791 |   | 12/1995 | Schalk et al. | 395/2.42 |
| 5,488,652 | * | 1/1996 | Bielby et al. | 379/88 |
| 5,581,600 | * | 12/1996 | Watts et al. | 379/67 |
| 5,583,920 | * | 12/1996 | Wheeler, Jr. | 379/88.01 |
| 5,638,425 | * | 6/1997 | Meador, III et al. | 379/88 |
| 5,719,921 | * | 2/1998 | Vysotsky et al. | 379/88 |
| 5,881,135 | * | 3/1999 | Watts et al. | 379/88.02 |
| 5,949,762 | * | 9/1999 | Green et al. | 370/259 |

FOREIGN PATENT DOCUMENTS

| 0550273 | 7/1993 | (EP) | H04Q/11/04 |
| 2280820 | 2/1995 | (GB) | H04M/3/50 |
| WO96/25733 | 8/1996 | (WO) | G10L/3/00 |

OTHER PUBLICATIONS

IBM Publication, DirectTalk/6000 "Speech Recognition with the HARK Recognizer", Release 5, SC33–1589–00, Jul. 1995.

* cited by examiner

Primary Examiner—Allan Hoosain
(74) Attorney, Agent, or Firm—Jerry W. Herndon

(57) ABSTRACT

A voice processing system comprising a digital trunk processor 135 and a system unit 145 incorporates a local voice recognition resource 185 provided on a digital signal processing board 180, and can access a remote voice recognition resource 320 in a server 300 via a local area network 250. The system provides a barge-in facility for the recognition resource on the remote server, whereby a prompt is played out to the user, and the incoming telephony signal is fed into a voice activity detector on the digital trunk processor. Responsive to a detection of incoming voice activity, the outgoing prompt is terminated, and the incoming data is transferred over the local area network to the remote server for recognition.

16 Claims, 4 Drawing Sheets

VOICE PROCESSING SYSTEM

BACKGROUND OF THE INVENTION

The present invention relates to voice processing systems, and more particularly to voice processing systems which utilise particular processing resources, such as voice recognition systems.

Voice processing systems whereby callers interact over the telephone network with computerised equipment are very well-known in the art, and include voice mail systems, voice response units, and so on. Typically such systems ask a caller (or called party) questions using prerecorded prompts, and the caller inputs answers by pressing dual tone multiple frequency (DTMF) keys on their telephones. This approach has proved effective for simple interactions, but is clearly restricted in scope due to the limited number of available keys on a telephone. For example, alphabetical input is particularly difficult using DTMF keys.

There has therefore been an increasing tendency in recent years for voice processing systems to use voice recognition in order to augment DTMF input. The adoption of voice recognition permits the handling of callers who do not have a DTMF phone, and also the acquisition of more complex information beyond simple numerals from the caller.

One particular concern with voice processing systems is to allow a caller to interrupt a prompt before it has finished (for example, if they are familiar with the system from regular use, such as might be the case with a voice mail system, and therefore know in advance their desired option). Most voice processing systems already allow a caller to interrupt a prompt by pressing an appropriate DTMF key. This is achieved by listening for incoming DTMF signals at the same time as an outgoing prompt is being played.

It is desirable to allow the caller to perform a similar interruption by speaking, rather than pressing a DTMF key. The caller input is processed by the voice recogniser, and the system then performs the requested action. The ability to accept such interruptions during an outgiong prompt is known as barge-in or cut-through.

One difficulty with the support of barge-in is that an outgoing prompt may be partially echoed back from the telephone network, and then accidentally mistaken for voice input from the caller, or else distort actual voice input from the caller. Many voice recognition systems therefore include an echo cancellation facility in order to facilitate barge-in. Effectively, such echo cancellation involves subtracting from the incoming signal a suitably transformed version of the outgoing signal, the intention being that the subtracted transformed version of the outgoing signal negates any echo that might be received.

The following documents are illustrative of the current art in the voice processing industry.

WO96/25733 (BT) describes a voice response system which includes a prompt unit, a Voice Activity Detector (VAD), and a voice recognition unit. In this system, as a prompt is played to the caller, any input from the caller is passed to the VAD, together with the output from the prompt unit. This allows the VAD to perform echo cancellation on the incoming signal. Then, in response to the detection of voice by the VAD, the prompt is discontinued, and the caller input is switched to the reco unit, thereby providing a barge-in facility.

U.S. Pat. No. 5,459,781 describes a voice processing system with a line interface unit, an echo cancellation unit (adjacent to the line interface unit), a voice activity detector (VAD), a prompt unit, a DTMF detector, and a recorder. In this system, both incoming and outgoing signals pass through the echo cancellation unit, where echo cancellation is performed. This system addresses the problem that caller voice input to the recorder may accidentally be mistaken for DTMF input. Therefore, if the VAD detects incoming speech to be recorded, the DTMF detection is switched off (since it is unlikely that the caller would make a genuine DTMF input at this time). It is also suggested that VAD could be used to avoid recording silence, thereby conserving resources.

U.S. Pat. No. 5,155,760 discloses a voice mail system including a voice recorder, a circular buffer, a voice activity detector (VAD), a prompt unit, a line interface unit, and an echo cancellation unit adjacent to the line interface unit. Caller input and prompt output are passed to the echo cancellation unit to allow echo cancellation to be performed. In operation, a prompt is played to the caller. Caller input is then routed to the VAD, and also to the circular buffer. In response to the VAD detecting voice, the caller input is fed to the voice recorder, along with the buffer contents. This ensures that the first part of the caller input (which triggered the VAD) is also properly recorded.

U.S. Pat. No. 5,4757,91 describes a voice processing system including a prompt unit, a buffer, and a digital signal processor (DSP) unit for performing echo cancellation, voice activity detection (VAD), and speech recognition. In this system, a prompt is played to the caller, and both the caller input and prompt are fed to the DSP unit to perform echo cancellation. The echo cancelled signal is fed (i) to the buffer, and (ii) to a VAD algorithm. On detecting voice, the outgoing prompt is terminated, and the DSP switches from echo cancellation mode to speech recognition mode, whereupon speech recognition is then performed on the caller input, including that stored in the buffer.

One of the drawbacks with the approach described in U.S. Pat. No. 5,4757,91 is that the DSP is required throughout the time that barge-in is enabled, firstly to perform echo cancellation, and then to perform voice recognition. However, DSP resource, particularly for voice recognition, is expensive, and this can prove prohibitive if the voice processing system is to support many lines of telephony input simultaneously.

Many voice processing systems include a special DSP card for running voice recognition software. This card is connected to the line interface unit for the transfer of telephony data by a time division multiplex (TDM) bus. Most commercial voice processing systems, more particularly their line interface units and DSP cards, conform to one of two standard architectures: either the Signal Computing System Architecture (SCSA), or the Multi-vendor Integration Protocol (MVIP).

A somewhat different configuration is described in GB 2280820, in which a voice processing system is connected via a local area network to a remote server, which provides a voice recognition facility. This approach is somewhat more complex than the TDM approach, given the data communication and management required, but does offer significantly increased flexibility. For example, there is no need to match a DSP card with a line interface unit conforming to the same bus architecture, and also a single server can support multiple voice processing systems (or vice versa). However, the existence of two such different configurations can cause problems for the user, who generally has to tailor their application for one specific configuration, constraining the generality of such application.

Note also that if the voice recognition system described in U.S. Pat. No. 5,475,791 is provided as part of the server system in the arrangement of GB 2280820, then the need to transmit the prompt output to the DSP to perform the echo cancellation becomes particularly troublesome. Thus having to transmit the prompt output to the remote system for echo cancellation will tend to double the bandwidth required between the voice recognition server and the voice processing system, increasing overall system costs.

SUMMARY OF THE INVENTION

Accordingly, the present invention provides a voice processing system comprising: a telephone interface unit over which telephony calls can be made and received; an application program for controlling the processing of said telephony calls; a voice recognition resource located either on a remote server system, or on an adapter card connected to said telephone interface unit via a time division multiplex (TDM) bus; and a voice technology subsystem providing an application interface for said application program to access said voice recognition resource, said application interface rendering the location of said voice recognition resource transparent to the application program.

Hiding the location of the voice recognition resource from the application in this manner provides the application designer with much more flexibility and portability, since the same application can easily be used with different recognition systems. This is beneficial for example where the application is to be ported into another language (where a different recognition system is to be used), or to provide additional reliability (allowing an alternate backup recognition system to be used if necessary), or to provide load balancing (where multiple recogntion systems are available), or to allow the application to rapidly take advantage of newly developed recognition systems.

The application interface does not require the application to specify the system location of the voice recognition resource in terms of its connectivity into the voice processing system, namely whether or not the recognition resource is attached via a hardware TDM bus, or instead by a software data connection. Instead each recognition resource has an associated recognition server, and the voice technology subsystem derives information from the recognition server concerning the location of the associated recognition resource.

Thus in general terms, the voice technology subsystem is already provided with knowledge of how to handle recognition resources according to their location, and so does not need to obtain this information from the user application. However, it still needs to determine which approach to use with which available resource. This information is derived from the recognition server when a particular recognition channel is requested (or alternatively upon initial registration of a recognition resource), and so can be used to establish a path for telephony data between the telephone interface unit and the voice recognition resource in accordance with the determined location of the voice recognition resource.

It is further preferred that the voice technology subsystem interacts with the recognition server via a predetermined recognition interface which is independent of the location and nature of the recognition resource associated with said recognition server. Thus the voice technology subsystem may potentially have to interoperate with a large number of different recognition systems. It is therefore desirable for the subsystem to present just a single recognition interface, which all recognition servers must adhere to. Thus the recogntion server effectively serves as an insulating layer between the voice technology subsystem and the different recognition resources.

In the preferred embodiment, the voice technology subsystem includes a client component, which includes said means for establishing a telephony path, and a server component, which interacts with the recognition server, wherein the operation of said server component is independent of where the voice recognition resource is located.

In one embodiment, the application program accesses said voice recognition resource via said interface by specifying a named resource. An alternative approach is for the application program to access said voice recognition resource via said application interface by specifying a desired function, for example single digit, multiple connected digits, wide vocabulary, and so on. This alternative approach allows the application to be written in very generic terms, but may not be so appropriate if the desired function is non-standard.

BRIEF DESCRIPTION OF THE DRAWINGS

An embodiment of the invention will now be described in detail by way of example only with reference to the following drawings.

DETAILED DESCRIPTION

Figure 1:
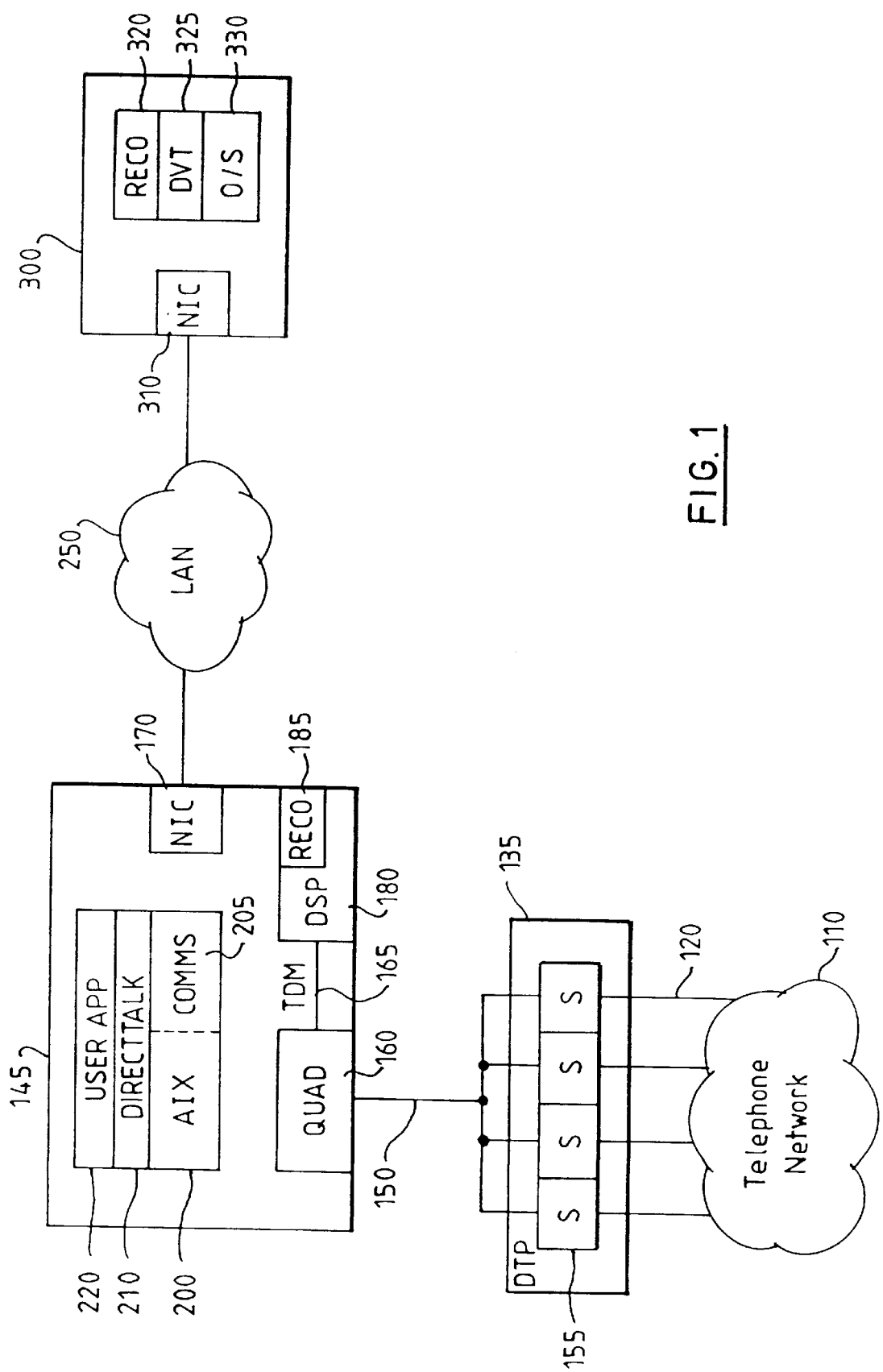
FIG. 1 is a simplified schematic diagram of a voice processing system connected to a remote server.

FIG. 1 illustrates in simplified schematic form the main hardware and software components of the DirectTalk for AIX voice processing system, available from IBM Corporation. The voice processing system is connected to the telephone network 110 by one or more digital trunk lines 120, each carrying multiple telephony channels (T1 digital trunk lines in North America comprise 24 channels, E1 digital trunk lines in Europe comprise 30 channels). It will be appreciated that in some installations, the digital trunk lines may be connected to the telephone network 110 via a switch or PBX; indeed one possibility is for the voice processing system to effectively be a part of the telephone network itself, providing intelligent services to the network.

The voice processing system has two main components, a line interface unit 135 and a system unit 145. The line interface unit 135 is also referred to as the digital trunk processor, and contains one or more subsystems known as SPACKS. Each SPACK 155 terminates one digital trunk line and is responsible for interfacing with the telephone network over that line, including signalling, demultiplexing incoming telephony signals, and so on. In addition, each SPACK contains digital signal processors (DSPs) which can be used to perform various functions, such as detection of voice activity on a particular telephony channel, compression/decompression of voice signals, and DTMF recognition. The microcode for running on the SPACKs is downloaded from the system unit onto the digital trunk processor 135 when the voice processing system is powered on.

The system unit 145 of the DirectTalk voice processing system comprises an RS/6000 workstation, which runs the AIX operating system 200. The DirectTalk voice processing program 210 runs on top of the AIX operating system, and in turn interacts with a user application 220 in order to determine how calls should be processed. The system unit includes one or more trunk adapter cards 160 for interfacing to the digital trunk processor 135 via link 150. The adapter illustrated in FIG. 1 includes a single QUAD adapter, which can be connected to up to four SPACKs simultaneously. The system unit also contains a network interface card 170 which allows programs running on the workstation to communicate over a local area network (LAN) 250, using communications software 205 incorporated into the AIX operating system. In addition, the system unit includes a digital signal processing (DSP) card 180, which is connected to the trunk adapter (or adapters) via a time division multiplex (TDM) bus 165. Speech recognition software 185 is installed on the DSP card. In the present implementation, the TDM bus comprises an SCbus, and the DSP card comprises an Antares card, both available from Dialogic Corporation, New Jersey, USA, whilst the speech recognition software on the DSP card is supplied by Voice Control Systems Inc (VCS), of Texas, USA, although other recognition systems could be used.

It will be appreciated that there are many possible variations in the design of the voice processing system of FIG. 1. For example, some voice processing systems accept input from analog lines rather than digital trunks; whilst some voice processing systems combine the digital trunk processor and trunk adapter into a single adapter card located in the system unit. The skilled person will appreciate that such variations are not pertinent to the principles of the present invention.

Also, it should be noted that a TDM bus connection as shown in FIG. 1 provides a uni-directional data flow, so that as is well-known in the art, a pair of such connections are needed to support a full duplex telephone conversation. Thus for situations where a duplex link is required, references herein to a telephone connection and such like should be taken to imply sufficient connections as are necessary; similar considerations apply throughout the voice processing system-ie not just for the TDM bus).

Returning now to FIG. 1, a server system 300 is attached to the LAN 250 via network interface card 310, and supports an operating system 330, speech recognition software 320, and a DVT ("distributed voice technology") software subsystem. The server communicates with the voice processing system via the DVT subsystem 325 and a suitable communications stack in the operating system 330. In the present implementation, the server 300 is another RS/6000 workstation running the AIX operating system, and the speech recognition software is the HARK recogniser available from BBN HARK Systems Corporation (BBN), of Massachusetts, USA, although other recognition systems could also be used.

Figure 2:
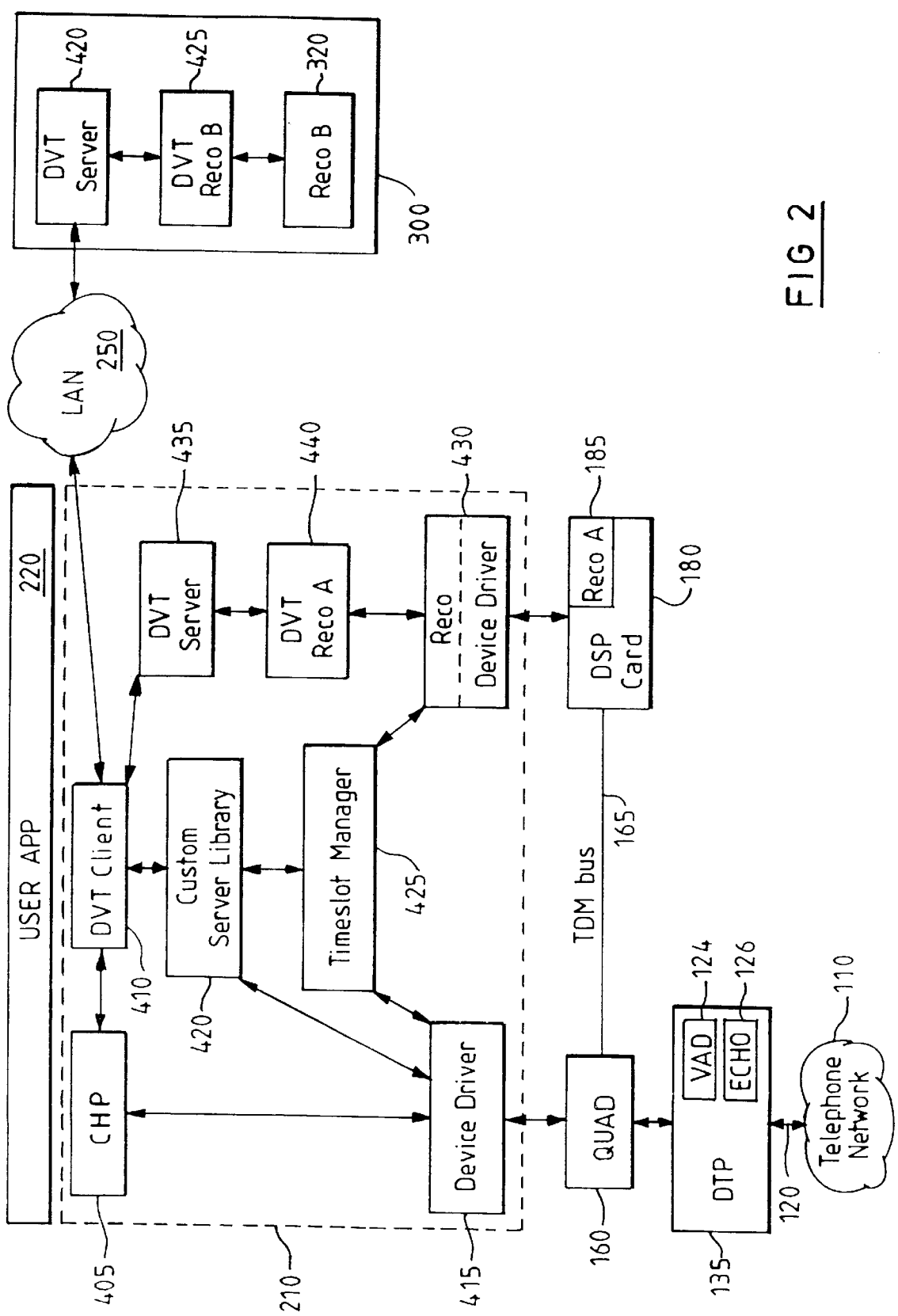
FIG. 2 shows further details of the voice processing system of FIG. 1.

As explained previously, it is desirable in many voice processing applications to perform speech recognition. FIG. 2 illustrates in more detail the main components necessary for an understanding of how this can be accomplished for the DirectTalk system (for clarity, certain standard components such as the operating systems have been omitted from this diagram). In particular, FIG. 2 illustrates pertinent features of the DirectTalk voice processing program 210, including the channel processor 405, which is used to interpret user applications 220. The channel processor and relevant call processing script (known as a state table) is invoked either in response to receipt of an incoming call as detected by the digital trunk processor, and notified via the device driver 415 for the trunk adapter 160, or as initiated by the application itself.

As shown in FIG. 2, there are two voice recognition resources available to the application. The first of these, denoted as Reco A 185, is installed on the DSP card 180 in the system unit. The second voice recognition resource, Reco B 320, is available remotely via the LAN 250 on server 300. Associated with each speech recognition resource is a corresponding DVT server subsystem (server 435 for Reco A and server 420 for Reco B0), which is responsible for allocating voice recognition resources to different telephony channels for its respective speech recognition resource (more precisely, a recognition resource is allocated to the user application which is responsible for handling a particular telephony channel). The DVT server and associated resource communicate via a corresponding DVT Reco subsystem (subsystem 440 for Reco A and subsystem 425 for Reco B). The purpose of this subsystem which effectively acts as a form of recognition server is to insulate the DVT server from needing to know the details of any particular speech recognition system. In other words, there is a generic interface between the DVT server and the DVT Reco subsystem, with the latter then performing any translation necessary for the particular speech recognition system to which it is attached.

Note that since Reco A is installed on DSP card 185, it is controlled via a corresponding device driver 430 (this driver is shown as split into two components, the first at a higher level relating to the recognition software itself, the second to the general DSP card). By contrast, Reco B is a purely software system, and so does not need any device driver.

The channel processor interacts with a DVT server via the DVT client 410. In the context of the DirectTalk voice processing system, the DVT client represents a custom server, which can exploit a set of functions available in the custom server library 420. These functions allow a custom server (such as DVT client, or another user-written custom server) to process telephony data in ways not directly available to a state table via the channel processor. Examples of the use of the custom server are presented in the IBM AIX DirectTalk v1.6 Voice Application Development guide, reference number SC33-1722-00, and other manuals referenced therein, available from IBM Corporation.

One particular function in the custom server library can be used to instruct a timeslot manager 425 to connect a channel on the trunk adapter with a channel on the DSP card via the TDM bus. This is achieved by the timeslot manager sending appropriate instructions to the trunk adapter and DSP card via their respective device drivers.

Also shown in FIG. 2 are two particular pieces of code which execute on DSPs included within the digital trunk processor 120. The first of these is a voice activity detector (VAD) 124, which monitors the incoming telephone signal to discriminate the presence of voice energy on the line (as opposed to silence, DTMF and other signalling tones, and hopefully most noise). In response to the detection of voice energy on the line, the VAD sends a notification back to the system unit 145 via the trunk adapter card 160 and associated device driver 415. Note that there will normally be a slight delay between the onset of voice energy on the line, and triggering of the voice activity detector, in order to prevent accidental triggering by transient noise. This delay is not normally significant in terms of response time to the caller, being typically up to something like 0.1 seconds, depending on the particular voice detection algorithm used (nb suitable algorithms are well-known in the art, see for example U.S. Pat. No. 5,533,118).

The other piece of code shown in FIG. 2 as executing on the digital trunk processor is the echo cancellation facility 126. For each channel, the echo cancellation code monitors the outgoing signal, and applies an appropriate transformation (including delay) to produce an estimated echo signal. This estimated echo signal is then subtracted from the incoming telephony signal to provide echo cancellation. The transformation to produce the estimated echo from the outgoing signal is based on a set of echo coefficients. The derivation of suitable echo coefficients as each channel connection is formed is well-known in the art (see for example U.S. Pat. No. 4,751,730 and U.S. Pat. No. 5,351,291).

Figure 3:
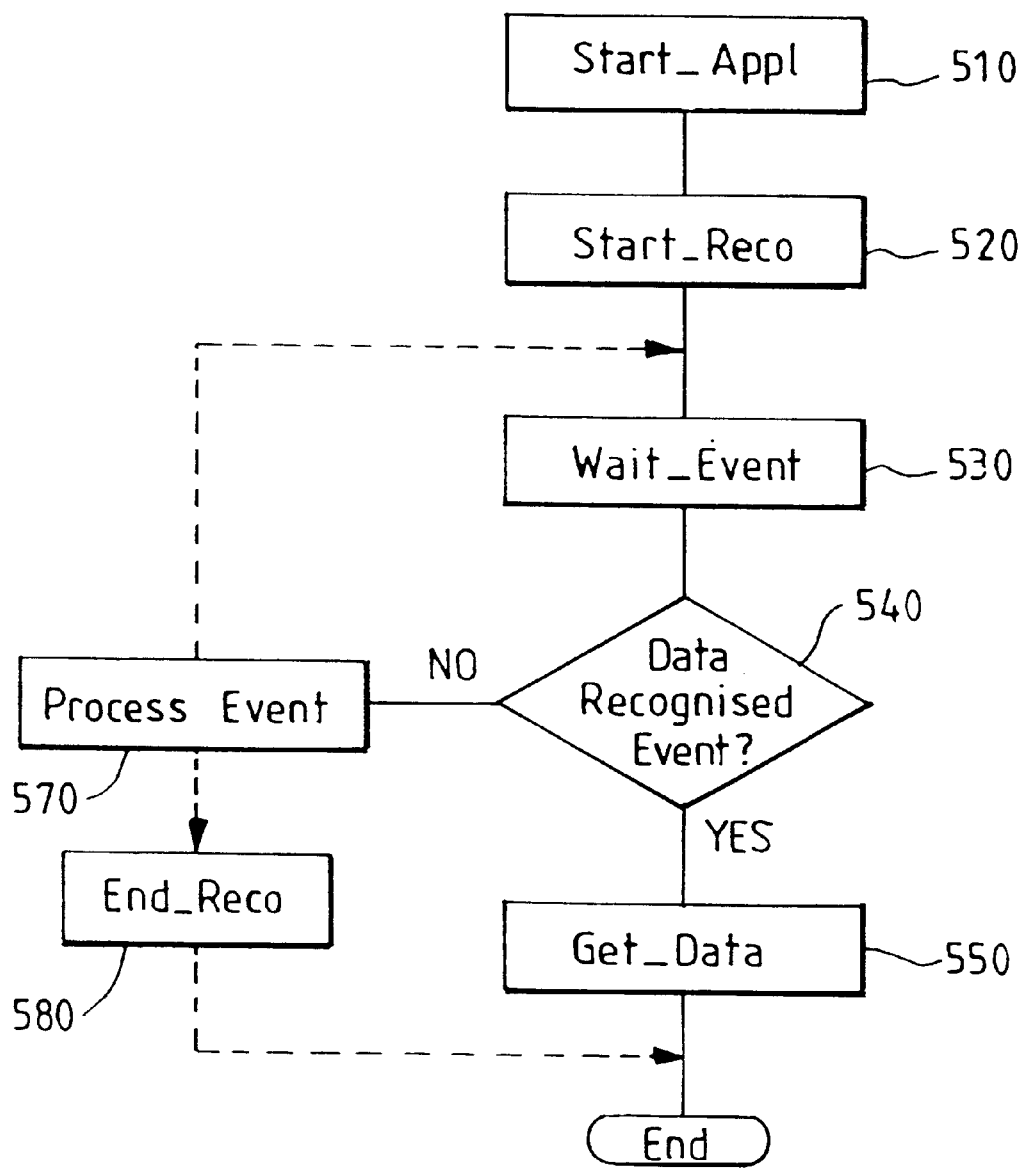
FIG. 3 illustrates the method steps for performing speech recognition using the voice processing system of FIG. 1.

The operation of the voice processing system discussed above for performing voice recognition will now be described with reference to FIG. 3. Thus when an application desires to use a voice recognition resource, an appropriate state table action is called to pass a corresponding request (Start_Appl) to the DVT client (step 510). This request identifies both the particular speech recognition resource to be used, and also specifies a recognition application (eg vocabulary and other information) to be used in conjunction with that resource.

As discussed in more detail below, the DVT client knows which recognition resources it has access to, but not which recognition applications they support. Therefore, the DVT client forwards this request to the appropriate DVT server, which then interrogates its associated voice recognition system via the DVT Reco subsystem to ascertain whether or not the recognition application is supported, and if so, whether there is a free recognition channel currently available. Assuming this to be the case, the free channel is reserved, and the DVT server sends a positive response back to DVT client. In addition, the DVT server determines from the DVT Reco system whether or not its associated resource has a TDM attachment, and this information is also passed back to the DVT client. Note that so far, the processing is essentially the same, independent of whether the DVT server is associated with a remote server voice recognition facility or with a local DSP card supporting voice recognition. It will also be appreciated that at this point, no incoming telephony data is being transferred into the recognition system.

The next action of the DVT client depends on whether Reco B or Reco A (of FIG. 2) has been selected, and more particularly on whether the recognition resource is to be accessed via the TDM bus, or via a data communicaitons channel (the DVT client is aware of this information as described above). In the former case DVT client makes a call into the custom server library which results in setting up a link between DVT client and the trunk adapter device driver. In particular, this link allows DVT client to extract incoming telephony data off the trunk adapter for a desired channel. This data can then be transmitted over the LAN to the server. In fact, two possible modes of operation are supported for the server. In the first mode, the telephony data is transmitted to DVT server, and then passed down through the DVT Reco subsystem into the recognition resource. Alternatively, in the second mode, data is transmitted direct from DVT client to the recognition resource. This second mode allows slightly quicker transfer of data between DVT client and the recognition resource, but does require the recognition resource to be able to receive the data transfer in the correct format. Note that all commands (as opposed to data) between DVT client and the remote server system use the first mode of communication.

On the other hand, where the voice recognition is to be performed by code running on the DSP card, an appropriate connection must be established over the TDM bus between the trunk adapter and the DSP card. This is accomplished via the custom server library, by means of a call to the timeslot manager. This call specifies the number of the relevant channel on the trunk adapter, and the number of the free channel which has been allocated by the recognition system. The timeslot manager then makes calls to the device drivers for the trunk adapter and the DSP card to connect these two channels to a particular timeslot on the TDM bus, to allow telephony data to be received into the voice recognition resource. In this arrangement therefore, the voice data flows directly from the trunk adapter card onto the DSP card. However, although voice data is now being received by the Reco A, it is not, as yet, being processed (ie it is simply being discarded, save for the line convergence discussed below).

The next state table action serves to start recognition (step 520) via a Start_Reco call into DVT client. In both cases (ie for both Reco A and for Reco B), after the Start_Reco has been issued and DVT client informs the state table that this command has been successfully received, the state table now generally enters a Wait_Event state (step 530), in which it can receive notification of various possible events, such as DTMF recognition, caller hang-up, and so on. Meanwhile, the recognition resource processes the incoming telephone signal, until it has recognised the word or phrase spoken. The recognised text is then returned via DVT server and DVT client, which provides an appropriate event (step 540) to the application (for design reasons this event is actually routed through the trunk adapter device driver, which is specifically enabled to send events to the application; however the event could equally well be passed directly from DVT client to the state table). On receipt of this event, the application issues a Get_Response command to DVT client (step 550), which then returns the recognised text back to the application.

The application may now decide to release the recognition resource, this being effected via a End_Appl call to DVT client (not shown in FIG. 3), resulting in an appropriate message to the relevant DVT server. Note that some applications effectively hold a voice recognition channel for an entire call, whilst others allocate and then deallocate for each user response (or some intermediate strategy). This latter approach in theory leads to more efficient use of recogniser channels, but does suffer from additional overheads with respect to the increased allocation and deallocation of channels.

Returning for a moment to the Wait_Event state at step 530, if the next incoming event at step 540 does not correspond to the notification that speech has been recognised, then that event is processed accordingly (step 570). Depending on the nature of this event, the state table will then either return into the Wait_Event state (ie back to step 530), or may exit (for example if caller hang-up is detected). In the latter case the recognition system can be allowed to complete the recognition, but its response ignored, but preferably the application issues an End_Reco call (step 580), which is passed from DVT client to the relevant recognition system. This command causes the recognition system to explicitly abort the relevant recognition process, thereby conserving system resources.

The preceding description has focussed on the general provision of speech recognition for a voice processing system. The present embodiment allows this speech recognition to be turned on at the same time that a prompt is being played out to the caller, thereby allowing the caller to make a spoken interruption of the prompt. This facility, which is generally known as barge-in or cut-through, is particularly useful for voice processing applications such as voice mail, where the caller is likely to encounter the same sequence of prompts repeatedly, and accordingly may be able to select a desired option without needing to listen to all of the prompt.

Figure 4:
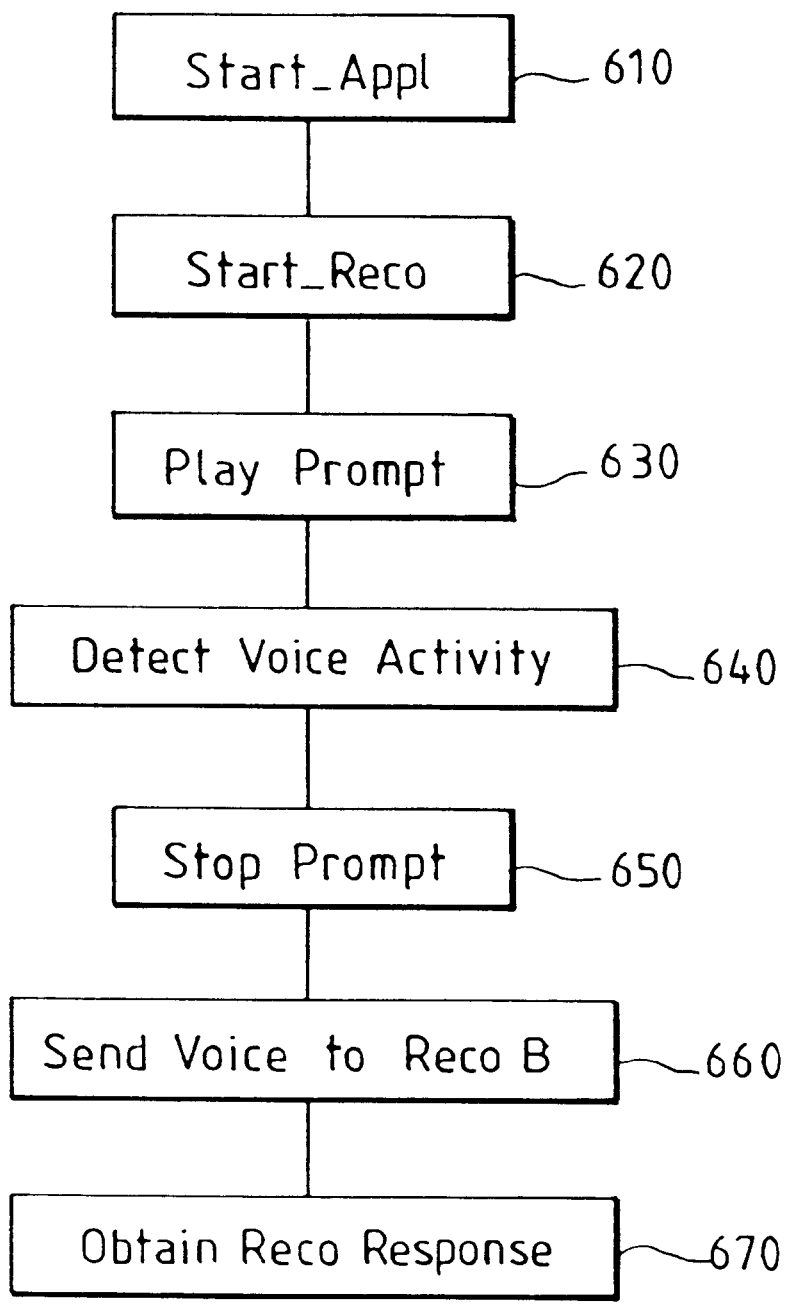
FIG. 4 illustrates the method steps for performing barge-in using the voice processing system of FIG. 1.

The process of performing barge-in is illustrated in FIG. 4, and begins with a request (Start_Appl) from the state table into the DVT client for a voice recognition resource (step 610). As before, this request specifies both a recognition system (ie A or B in the system shown in FIG. 2), and also a particular recognition application to be used for this recognition. For present purposes, it is assumed that the application requests a resource which is located on the server, in other words, Reco B, and that this resource is available. Thus the DVT client sends a request to the DVT server to reserve the requested resource, which DVT server does by appropriate interaction with the DVT Reco subsystem associated with Reco B. A response is then sent from DVT server back to DVT client, and from there to the application, indicating that the requested resource has been allocated. In addition, the Start_Appl command causes the appropriate data connections to be set up (same as for FIG. 3).

Next, the state table issues a Start_Reco command (step 620). By setting a parameter in this command, it is possible to specify when recognition should start; for example, immediately, or after a "beep" played by the voice processing system. For barge-in, speech recognition is requested to start upon the detection of incoming voice energy. Therefore, initially no telephony data is transferred to the server, and no speech recognition is performed.

Next, a voice prompt is played to the caller, via a conventional state table action (step 630). The state table action allows an application designer to specify that prompt output should be stopped in particular eventualities. For example, one such eventuality is where the caller inputs a DTMF tone, which is recognised by appropriate software within the digital trunk processor (not shown in FIG. 2). This DTMF tone can then be returned to the state table from the DTP via the trunk adapter and its device driver. For barge-in, an application can specify that prompt output should be terminated in response to voice input. Thus in this case, the voice activity detector in the digital trunk processor monitors incoming audio for voice activity. When (if) voice energy is detected (step 640), then the DTP notifies the trunk adapter device driver through the trunk adapter, and the device driver responds by terminating output of the prompt (step 650).

In order to provide barge-in, it is necessary not only to detect the voice input, but also to be able to recognise it. To achieve this, the incoming telephony signal is received by the trunk adapter device driver, and written continuously into a circular buffer. The size of this buffer is at least sufficient to store data corresponding to the time which it takes the voice activity detector to trigger on voice input. As long as no voice signal is present on the incoming line, the device driver cycles round the circular buffer, over-writing the input after a pre-determined time. However, responsive to notification from the voice activity detector that voice energy is now present on the incoming line, the device driver makes available to DVT client the incoming telephony data, including the data in the circular buffer representing the start of the voice input. This ensures that the beginning of the caller's response is not lost. The DVT client now transmits this data to the DVT server, which passes it to Reco B (step 660), bearing in mind that a recogniser channel has already been requested and is therefore available to receive this signal. The transfer of data between the DVT client and Reco B may occur in either of the two modes discussed above.

After the caller's response has been recognised, Reco B returns to DVT client via DVT server the recognised text. This is then passed to the state table application by the DVT client (step 660) using the same mechanism as described in relation to FIG. 3 (ie putting the application into a Wait_Event state, and then issuing a Get_Response command upon being notified that data has arrived back into the DVT client). The state table can then take whatever action is appropriate, given the recognised word.

One reason for the slightly complicated method of returning text from the recognition system to the state table is that once a state table issues a DVT call, it waits for a response before proceeding to the next action. In an earlier version of the DVT interface, this meant that after a Start_Reco command, the state table would then wait until the recogniser returned the actual text back to it. This arrangement is fine for voice recognition on caller input which does not start until after completion of the relevant prompt. However, for barge-in it will be appreciated from FIG. 4 that the state table performs two actions simultaneously, namely recognition (starting with step 620), and playing a prompt (step 630). Thus, it is not possible for the state table to go into a waiting state after the Start_Reco, since it needs to follow this by playing a prompt.

Therefore, a more asynchronous model is adopted, whereby a positive response to Start_Reco is returned simply to indicate that recognition has (can) begin. This approach necessitates the subsequent Get_Response call in order to retrieve the actual recognised text. Note also that it is not advisable to automatically issue the Get_Response call straight after the play prompt command, since this will cause the state table to block waiting for data from DVT client. In such a condition, the state table is unable to react, should the caller for example hang-up, not speak at all, or provide a DTMF input. Instead, the Wait_Event state is used at this point (see step 530, FIG. 3). This ensures that the DVT client actually does have recognised data available before the Get_Response call is issued, and therefore is in a position to properly return the recognised text to the application.

The approach described above avoids the need to process the incoming voice signal, other than in the voice activity detector, until it is known that something of interest has been received (ie other than silence or noise). In particular, this reduces internal processing requirements at the voice processing system and at the remote recogniser, and also reduces transmissions over the network from the voice processing system to the server.

Note that by initially allocating the recogniser channel when barge-in is first enabled, rather than at the detection of voice activity, the system ensures that appropriate recognition resource is already available when required. However, it would be possible to modify the approach described herein to try to enhance recognition resource usage. One possibility would be to support over-allocation of recognition resources at the server, in view of the fact that not all allocated recognition channels will actually be processing data at any one time. For example, if Reco B is installed on a server system that supports say 20 channels of real-time voice recognition simultaneously, then one can contemplate allowing up to say 25 channels of recognition to be allocated at any one time. Because allocated channels are not continuously used, then the number of channels actually operating is expected to be below the 20 channel limit. Of course the possibility would remain that in rare cases the 20 channel limit might be exceeded, resulting in recognition delays (one would have to ensure that this did not cause actual errors or system problems). This over-subscription strategy attempts to maximise the usage and hence overall efficiency of the recogniser. It will depend on the details of an application itself whether such over-subscription is feasible and desirable, or whether a more conservative approach (corresponding perhaps to zero over-subscription) should be favoured.

A somewhat different strategy for trying to maximise recogniser efficiency is to delay requesting recogniser resource for a particular channel until voice activity has actually been detected on the incoming line. This approach tries to optimize recogniser efficiency, although it does require that the allocation of and connection to a recognition channel (if available) can be performed quickly. Also, it is more difficult to control the degree of any possible excess demand for recogniser channels (ie over-booking), other than through broad constraints on numbers of actual telephone lines in operation.

It will be appreciated that the over-subscription techniques described above are not limited in application to barge-in, but could in theory be applied to all recognition channels. However, such techniques are particularly attractive for barge-in, because this ties up allocated recognition channels even when no active recognition is in progress (since one cannot predict in advance whether or not a particular caller will interrupt).

Note that in the embodiment described above, the time taken to trigger the voice activity detector introduces a time-lag (latency) between the voice input awaiting to be processed, as stored in the circular buffer, and the current input from the caller. This in turn can lead to a delay between the caller finishing their response, and the recogniser being able to process this data. In order to minimize such a delay, it is preferred that the buffered audio data is fed to the recogniser faster than in real time. There is of course no fundamental reason why the recogniser should not process audio data in less than real-time, providing the server is a sufficiently powerful machine. This technique reduces any delay as perceived by the user.

In addition, the buffering of incoming audio data and subsequent recognition in less than real-time represents another potential optimisation of recogniser performance. Thus this matches throughput to the maximum possible level of the recogniser, rather than limiting processing to the voice input rate from the caller. Note that this buffering can in fact occur anywhere in the audio path, such as in the DVT client or in the DVT server, as well as in the device driver as described above. Probably the most preferred approach is to perform this buffering in DVT Reco, since it can then be tailored to the capabilities of the recognition resource. This is particularly advantageous where the voice processing system has access to two or more voice recognition resources (either on the same or different servers). For example, the maximum acceptable data input rate may vary from one recogniser to another, and also there may be little benefit in performing the buffering at times when the recogniser is lightly loaded.

One possible arrangement is to use this technique in conjunction with the just-in-time allocation of recognition channels; in this case the buffering doubles as a temporary holding stage should no recognition resource be available when requested. However, after such resource does become available, the faster than real-time delivery to the reco system and corresponding processing makes the buffering transparent to callers. In one embodiment, DVT Reco provides a plurality of virtual session handlers, each capable of processing caller input from one telephony channel. Each handler also includes a buffer for storing caller input from this telephony channel. DVT Reco then associates a virtual session with a real channel in said voice recognition resource as appropriate, for example, when there is a certain amount of voice data in the buffer, or as and when a recognition channel becomes available. At this point, the data is emptied from the buffer into the recogniser at faster than real time.

(Indeed, the use of virtual sessions to receive data into DVT Reco, which can then be allocated to a free recognition channel when available, provides an effective buffering mechanism for maximising usage of the voice recognition resource, irrespective of whether or not the voice is fed into the recogniser at a faster than real-time rate when a recognition channel allocation is made).

Sending the data to the recogniser faster than real-time minimises the number of necessary recognition channels. This is important, since most commercial speech recognition systems are generally priced according to the number of channels that can be simultaneously supported. Note also that this buffering of voice data for faster than real-time recognition is generally beneficial for all voice recognition actions (not just barge-in).

One limitation on the amount of buffering that can be performed is that it is not generally possible to determine in advance how long caller input will last. Thus it is not appropriate to buffer for five seconds, if the caller input is only for one second, since this then adds a four second delay into the recognition process. However, in many cases, it will be possible to estimate the likely caller response duration, and set the amount of buffering according; for example, the buffering time for an expected single digit response would be shorter than if the caller has been asked to give their post code (Zip code). Note that where the caller continues to talk after all available data is passed to the recogniser in faster than in real-time, then subsequent input will be at the natural rate of caller input. The most efficient approach is to use the voice activity detector for a second time, in order to determine when caller input has stopped (ie when voice activity on the line has terminated). This can then trigger the release of the complete caller utterance from the buffer into the voice recognition system, optimising utilisation of the recognition resources. This approach is most suited to situations where caller input is relatively short and simple; fortunately corresponding to those situations where voice recognition itself is most likely to be employed.

The above discussion of barge-in has focussed on the server implementation. However, the voice processing system of FIG. 2 also supports barge-in for TDM reco (Reco A) via the same set of application calls to DVT client, although the resulting processing is somewhat different. Thus returning to FIG. 4, upon the Start_Appl command (step 610), the timeslot manager forms a connection over the TDM bus between the incoming telephony channel and the allocated recognition channel in Reco A. The incoming telephony signal is then automatically routed into the recognition program on the DSP card (irrespective of whether the DVT client requested recognition to start at once, or upon detection of voice activity). The recognition program itself then becomes active upon the Start_Reco command (step 620) and listens to the incoming signal to detect voice activity; responsive to such a detection (step 640), the DVT client is notified accordingly. This information is then passed from the DVT client to the trunk adapter device driver, which stops the outgoing prompt (step 650). In the meantime, telephony input data continues to flow into the recognition system over the TDM bus (effectively analogous to step 660), until a detection is made, whereupon Reco A notifies DVT client that a recognition result is available. The DVT client then informs the application of this, using the same approach as for the server solution, thereby prompting the application as before to issue a Get_Response command in order to retrieve the recognised response (step 670).

Considering now the role of the echo cancellation software 126 (see FIG. 2), the echo cancellation coefficients are initialised for each telephone call by calling an appropriate system variable. This causes the actual initialisation routine to run when the system next plays a prompt down that telephone line. Thereafter echo cancellation can be performed whenever barge-in is enabled to prevent the echoed prompt from being accidentally misinterpreted as a user interruption.

Many prior art voice processing systems rely on the voice recognition software running on a DSP card to perform echo cancellation, as opposed to performing this cancellation in the line interface unit as described herein. However, the use of echo cancellation in the line interface unit, rather than in the DSP card, offers several advantages. Clearly, it allows the use of recognition systems which do not themselves include any echo cancellation facility (for example, because they are not primarily designed for a telephony environment). In addition, with echo cancellation being performed in the line interface unit, the echo cancellation can be initialised just once at the start of a call. By contrast, echo cancellation in Reco A must generally be initialised each time the recogniser is allocated to a particular call. Admittedly, it is possible to keep a recogniser channel allocated to a single call throughout, but this represents an inefficient use of recogniser resources if there are long periods in the call for which voice recognition is not required; indeed, it will often not be known in advance how many times voice recognition will actually be required for a given call. Moreover, in some circumstances a call may require speech recognition from two or more different systems; for example, if recognition in two different languages is being performed simultaneously (with the incoming call data being transferred to both recognition systems, potentially on two different servers), or if recognition is initially required from one vocabulary on one system, and subsequently from another vocabulary on another system (or simply for load balancing reasons across multiple servers). Clearly it is wasteful for each of these speech recognition systems to perform their own echo cancellation, when it can be done just once in the line interface unit.

Another benefit of performing the echo cancellation in the line interface unit is that the outgoing telephony signal necessary for estimating the echo to be subtracted is already available since it automatically passes through the line interface unit. By contrast, for Reco A to perform echo cancellation requires the use of an additional TDM timeslot to allow not only the incoming telephone signal but also the outgoing telephone signal to be routed into Reco A. Clearly this wastes bandwidth on the TDM bus.

A further benefit of performing the echo cancellation in the line interface unit is that it breaks the conventional one-to-one correspondence between echo cancellation resource and voice recognition resource. In other words, there is no need to allocate a voice recognition channel simply to perform echo cancellation on the incoming signal, rather, such allocation need only occur on actual detection of voice input. This is particularly important, given that recognition systems are normally costed on a per channel basis (ie according to the maximum number of channels that can be allocated simultaneously). Moreover, it is generally more efficient to perform the echo cancellation on dedicated DSP resources in the line interface unit, rather than in the comparatively more expensive voice recognition system.

In fact, the situation in the present implementation is somewhat more complex than indicated above, in that the TDM bus receives incoming audio data prior to echo cancellation, so that the audio data flowing into Reco A has not therefore been echo cancelled. Instead, the above-mentioned VCS recognition system provides its own echo cancellation facility, although this is not initialised in the manner described above. However, the VCS recognition system does perform a line characterisation, which essentially listens to the line during silence (hopefully), in order to determine the level of background noise on the line. The VCS recognition system makes this determination in response to the Start_Appl command, so that the relevant information is available when recognition commences following a Start_Reco command. More precisely, after DVT client sets up the TDM connection between the trunk adapter and the DSP card, it instructs the VCS recognition system to perform this line characterisation, before returning from the Start_Appl command. The state table is unable to perform any further actions whilst waiting for the return from the Start_Appl command, and therefore cannot play any prompts during this period, ensuring that there is silence on the line during the characterisation process.

Therefore, whilst the benefits of using echo cancellation in the line interface unit are not currently available in the present embodiment if Reco A is used, the system could be modified to change the data flow within the trunk adapter and digital trunk processor, such that data supplied to the DSP card over the TDM bus has already passed through the echo cancellation unit. (Note that although the TDM bus is connected to the trunk adapter card, the split or tap of the audio stream for the TDM bus when in use is made in the digital trunk processor).

Likewise, the buffering discussed above is also not available using the TDM approach in the current implementation. Again, however, such buffering could be added into the system, either at the line interface unit, or as a process running on the digital signal processing card.

An important aspect of the design of the present system is that the location of the voice recognition resource, including its manner of attachment (via TDM bus or not), is transparent to the user application. In other words, the interface between the user application and the DVT client is essentially independent of the underlying nature of the recognition resource being handled. This greatly increases the flexibility and portability of user applications, which can much more easily exploit new and improved voice recognition systems.

One reflection of the above feature is that the user application requests a recognition resource purely in terms of the name of the recognition resource itself, and also the name of an associated recognition application. Thus it is the responsibility of the DVT client to locate this resource, irrespective of how it is connected to the voice processing system.

In order to achieve this, both DVT client and DVT server send out a broadcast message when they are first brought up. Following this broadcast, a DVT client will receive responses from any available DVT servers. Thus the DVT client will know what DVT servers are currently available, and will also be informed of the recognition resources that they control. This information might also include details of how to connect to the relevant recognition resource, in particular, whether or not the resource is attached via the TDM bus, although in the present implementation this information is not sent until a request is made for channel allocation, as decribed above. Should any further DVT servers subsequently become available, the DVT client will become aware of their extra resources when the upcoming DVT servers broadcast their arrival. The DVT servers themselves learn of their DVT Reco subsystem (or subsystems) by the latter making an appropriate API call into the former. A DVT server will then send out another broadcast message to notify the DVT client(s) that it has a new recognition resource available. Note that the relationship between the DVT clients and DVT servers is many to many, in that one DVT client may use multiple DVT servers, and conversely, one DVT server may be used by multiple DVT clients. In addition, a DVT server may control multiple different recognition resources on a particular machine, although there can only be one DVT server on any given system (in other words, the relationship between a DVT server and the DVT Reco subsystems is one to many).

The main commands in the programming interface between the DVT client and the user application have already been discussed above in relation to barge-in: Start_Appl, Start_Reco, Get_Response, End_Reco, End_Appl (this interface also provides more specialised commands to allow callers to train a recognition resource). It will be noted that the same sequence of commands is used, irrespective of the location of the voice recognition resource to be used (or being used). This is achieved by making the DVT system aware of how to handle recognition resources attached via the TDM bus or located on a remote server, and receiving information concerning the location of a resource as part of the resource allocation (as part of the Start_Appl command).

In fact, as so far described the location of the resource is not completely transparent to the application in terms of the echo cancellation to be performed. Thus for a server recognition system, the echo cancellation in the digital trunk processor must be turned on, but this is not required for the present TDM-based VCS recognition system. It will be noted however that firstly this does not affect the interface from the user application into the DVT client, and also that a user application can always request echo cancellation in the DTP for all recognition resources—it is only that the DTP echo cancellation is effectively redundant in the case of the TDM-based recognition system. Moreover, for future versions it is clearly preferable to perform all echo cancellation in the DTP as discussed above, and remove or disable the DSP echo cancellation, in which case this slight discrepancy will disappear.

Turning now to the interaction between the DVT server and DVT Reco (also termed a recognition server), there is again a standard interface here to protect DVT server from needing to know the details of the recognition resource attached to any particular recognition server. Indeed, the DVT server does not know whether or not a given recognition resource has a TDM connection (although it can obtain this information from the recognition server, and forwards it to the DVT client during channel allocation, and also forwards any necessary telephony data from the DVT client into the recognition server during recognition). The actual interaction between the DVT server and the DVT Reco has largely been described above. Thus initially a recognition server registers with the DVT server, and also sets up sessions corresponding to the number of channels that can be processed on the recognition resource. These recognition sessions are normally assigned to a particular recognition application, but can in some circumstances be "floating" (ie potentially available for any recognition application supported by that resource). On receipt of a request for a particular recognition resource and application, the DVT server can access these sessions and the recognition server, to determine whether or not any are free, and then respond accordingly. Susequently, when recognition itself is to commence, the DVT server again passes this information into the recognition server, which then invokes the appropriate recognition system, whereupon recognition of the incoming telephony data can now start.

It will be recognised of course that many variations are possible with respect to the voice processing system of FIGS. 1 and 2. For example, the illustrated system has access to both a server voice recognition system, and also to a local DSP recognition system, whereas many voice processing systems will have access to only one such resource. Further, any suitable network could be used for communications between the server and the voice processing system, providing it had suitable transmission characteristics in terms of bandwidth and latency (eg one possibility might be to use an ATM connection). In addition, although the voice processing system illustrated has just a single local DSP resource, some voice processing systems may include multiple DSP cards, and each card potentially supporting multiple recognition programs running simultaneously. Moreover, Dialogic Corporation market an SCxbus adapter, which provides interconnection between TDM buses on different machines. Therefore, it would be possible to connect a recognition DSP card on one machine via this TDM bus extension to a trunk adapter on another machine. Conversely, although the server approach as shown has the recognition system installed on a separate machine from the line interface unit, it would clearly be possible for the software recognition system to be running on the same machine as the line interface unit, provided this machine had sufficient processing capability. This might be desirable if one wished to exploit some of the flexibility (such as the faster than real-time recognition described above) which is difficult to implement with the hardware/TDM bus configuration.

A further possible variation is that whereas recognition resources are located by name in the above embodiment, it would also be possible to make them available to applications by function. Thus there are many standard categories of voice recognition, for example, single digits, connected digits, letters, certain vocabularies, and so on. Each recognition resource on registering with the appropriate DVT server would specify the function(s) that it supported, and this information would then be routed back into the DVT client and stored. Thus a user application could now make a request for a particular voice recognition function, which would then be resolved by the DVT client into the appropriate recognition resource name. This approach gives the maximum flexibility to application designers, particularly in relation to the standard sets of vocabularies that in practice are most frequently encounted in commercial voice recognition systems.

What is claimed is:

1. A voice processing system comprising:
   a telephone interface unit over which telephony calls can be made and received, said telephone interface unit receiving an incoming audio signal as part of a telephone call;
   an application program for controlling the processing of said telephony calls;

first means for connecting a local speech recognition resource on an adapter card to said telephone interface unit via a time division multiplex bus, for transferring said incoming audio signal from said telephone interface unit to said local speech recognition resource via a timeslot on said time division multiplex bus;

second means for connecting a remote speech recognition resource on a server system to said telephone interface unit via a local area network, for transferring said incoming audio signal from said telephone interface unit to said remote speech recognition resource in packets over said local area network;

wherein said local speech recognition resource is different from said remote speech recognition resource, the former being provided on a DSP within said voice processing system, the latter being a purely software system external to the voice processing system;

said voice processing system further comprising a voice technology subsystem providing an application interface for said application program to access said local or remote speech recognition resource to process said incoming audio signal to determine recognised text corresponding to said incoming audio signal, said application interface rendering it transparent to the application program whether the incoming audio signal is transferred from the telephone interface unit to the local speech recognition resource over said time division multiplex bus or to the remote speech recognition resource over said local area network.

2. The voice processing system of claim 1, wherein each speech recognition resource has an associated recognition server, and the voice technology subsystem includes means for receiving information from the recognition server concerning where the speech recognition resource is located.

3. The voice processing system claim 2, wherein said voice technology subsystem interacts with said recognition server via a predetermined recognition interface which is independent of where the speech recognition resource associated with said recognition server is located.

4. The voice processing system of claim 3, wherein the voice technology subsystem includes means for establishing a path for telephony data between the telephone interface unit and the speech recognition resource in accordance with the received information about where the speech recognition resource is located.

5. The voice processing system of claim 3, wherein said application program accesses said speech recognition resource via said application interface by specifying a named resource.

6. The voice processing system of claim 3, wherein said application program accesses said speech recognition resource via said application interface by specifying a desired recognition function.

7. The voice processing system of claim 2, wherein the voice technology subsystem includes means for establishing a path for telephony data between the telephone interface unit and the speech recognition resource in accordance with the received information about where the speech recognition resource is located.

8. The voice processing system of claim 4, wherein the voice technology subsystem includes a client component, which includes said means for establishing a telephony path, and a server component, which interacts with the recognition server, wherein the operation of said server component is independent of where the speech recognition resource is located.

9. The voice processing system of claim 8, wherein said application program accesses said speech recognition resource via said application interface by specifying a named resource.

10. The voice processing system of claim 8, wherein said application program accesses said speech recognition resource via said application interface by specifying a desired recognition function.

11. The voice processing system of claim 7, wherein the voice technology subsystem includes a client component, which includes said means for establishing a telephony path, and a server component, which interacts with the recognition server, wherein operation of said server component is independent of where the speech recognition resource is located.

12. The voice processing system of claim 7, wherein said application program accesses said speech recognition resource via said application interface by specifying a named resource.

13. The voice processing system of claim 7, wherein said application program accesses said speech recognition resource via said application interface by specifying a desired recognition function.

14. The voice processing system of claim 1, wherein said application program accesses said speech recognition resource via said application interface by specifying a named resource.

15. The voice processing system of claim 1, wherein said application program accesses said speech recognition resource via said application interface by specifying a desired recognition function.

16. A method of operating a voice processing system including a telephone interface unit, said method comprising the steps of:

making and receiving telephony calls over said telephone interface unit;

controlling the processing of said telephony calls with an application program;

transferring an incoming audio signal within a telephone call from said telephone interface unit to at least one of: a local speech recognition resource connected to the telephone interface unit by a time division multiplex bus, via a timeslot on said time division multiplex bus; and a remote speech recognition resource on a server system connected to said telephone interface unit via a local area network, in packets over said local area network; wherein said local speech recognition resource is different from said remote speech recognition resource, the former being provided on a DSP within said voice processing system, the latter being a purely software system external to the voice processing system; and providing an application interface for said application program to access a speech recognition resource to process an incoming audio signal from a telephony call to determine recognised text corresponding to said incoming audio signal, said application interface rendering it transparent to the application program whether the incoming audio signal is transferred from the telephone interface unit to the local speech recognition resource over said time division multiplex bus or to the remote speech recognition resource over said local area network.

* * * * *